UNITED STATES PATENT OFFICE.

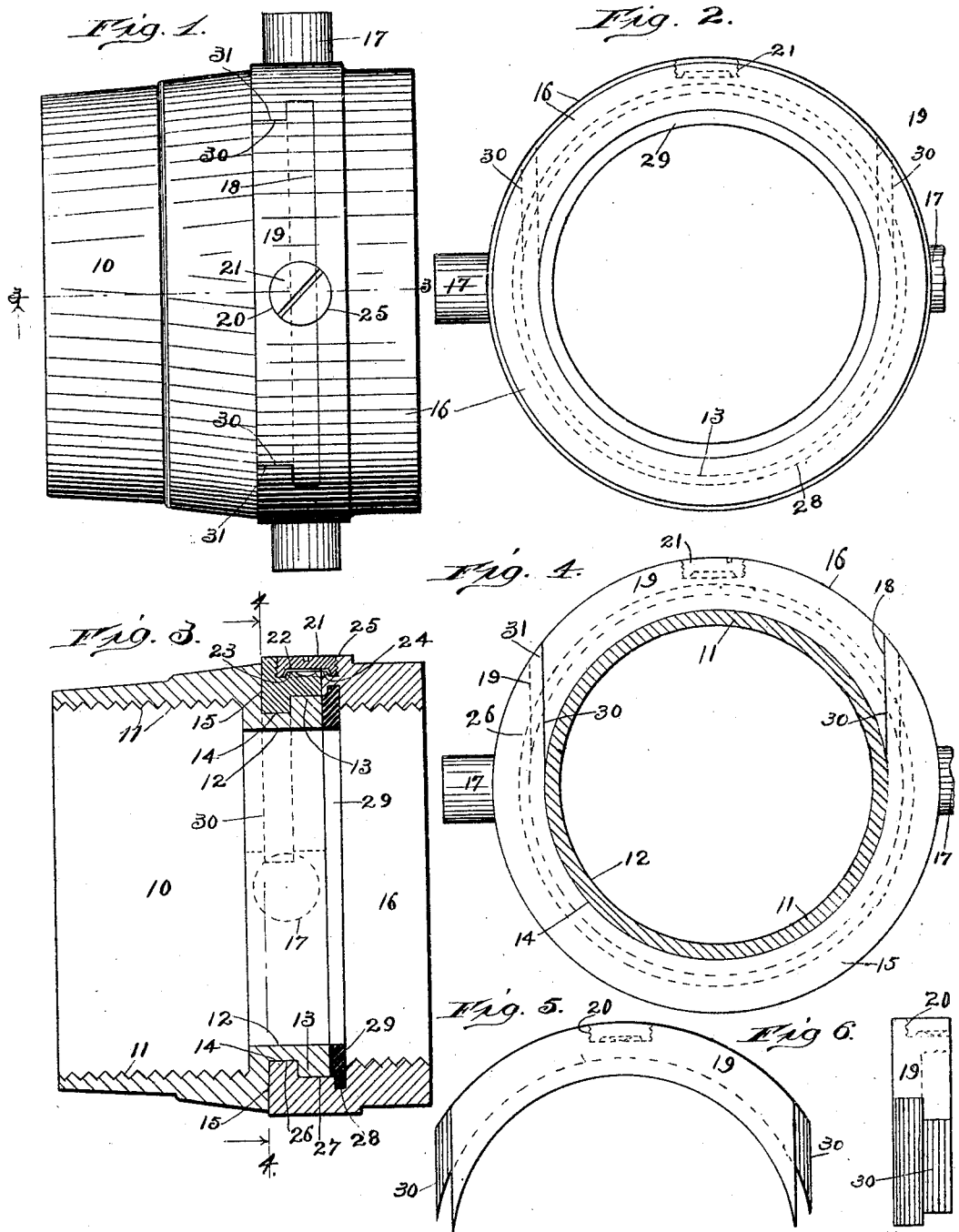

ALFRED ANDERSON, OF CHICAGO, ILLINOIS.

HOSE-COUPLING.

No. 804,992.  Specification of Letters Patent.  Patented Nov. 21, 1905.

Application filed March 24, 1905. Serial No. 251,722.

*To all whom it may concern:*

Be it known that I, ALFRED ANDERSON, a citizen of the United States, residing at Chicago, in the county of Cook and State of Illinois, have invented certain new and useful Improvements in Hose-Couplings, of which the following is a specification.

This invention relates to improvements in hose-couplings, and especially to that class of such couplings in which one member of the coupling is moved transversely into engagement with the other; and it consists in certain peculiarities of the construction, novel arrangement, and operation of the parts thereof, as will be hereinafter more fully set forth and specifically claimed.

The principal object of the invention is to provide a coupling of the above-named character which shall be simple and inexpensive in construction, strong, durable, and efficient in operation, and that is adapted to secure without twisting or turning the sections of a hose together or one section of a hose to a hydrant or other connection.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a plan view of a coupling embodying my invention, showing the parts assembled. Fig. 2 is an end view thereof looking from the outer end of the receiving member. Fig. 3 is a central sectional view taken on line 3 3 of Fig. 1 looking in the direction indicated by the arrows. Fig. 4 is a transverse sectional view taken on line 4 4 of Fig. 3 looking in the direction indicated by the arrows. Fig. 5 is a detached view, in side elevation, of the locking-piece or sector; and Fig. 6 is an end view thereof.

Like numerals of reference refer to corresponding parts throughout the different views of the drawings.

The reference-numeral 10 indicates the entering member of the coupling or that member which is adapted to be secured to a section of hose. As shown, the member 10 is cylindrical in shape and is provided with internal grooves 11 to engage its connection. The face of the member 10 is formed with a forwardly-extending portion 12, which is provided with an external annular flange 13, thus forming an annular groove 14 between the inner surface of the flange 13 and the face 15 of the entering member. The other or receiving member 16 is cylindrical in shape and is provided with internal screw-threads and is provided with internal screw-threads to engage a section of hose or the tubular projection of a hydrant, and preferably has on its periphery projections 17, located diametrically opposite each other and to be used for turning said member.

The face and inner portion of the member 16 is cut away to form a segmental recess 18 for the reception of the locking member or sector 19, which is provided in its upper portion with a circular screw-threaded depression 20 to receive and engage a portion of a retaining-screw 21, which is formed with a hollow or depression 22 to receive the outwardly-projecting portion 23 in the bottom of the depression 20, and an outwardly-projecting portion 24 in the bottom of the circular screw-threaded depression 25, formed in the edge of the recess 18 at about its middle. The face of the member 16 is provided with a circular internal flange 26, which extends from the ends of the recess 18, and thus forms a circular groove 27 for the reception and operation of the flange 13 on the face of the member 10, which flange is inserted through the transverse segmental recess 18 after the locking member or sector 19 has been removed. Outwardly from the groove 27 the member 16 is provided with an annular internal groove 28 for the reception of a gasket 29, of rubber or other suitable material.

By reference to Figs. 1 and 3 of the drawings it will be seen and understood that a portion 25 of the depression for the retaining-screw 21 is formed in the periphery of the member 16 and that said depression has in its bottom an outward extension 24 to fit in the hollow 22 of said screw.

The locking member or sector 19 is formed at each of its ends with a straight-edged recess 30 to receive the ends 31 of the flange 26 on the face of the receiving member.

From the foregoing and by reference to the drawings it will be clearly seen and readily understood that by approximating the faces of the members 10 and 16 they may be joined together by inserting the flange 13 laterally through the recess 18, so that said flange will fit in the groove 27 of the member 16, and at the same time the flange 26 of the last-named member will fit in the groove 14 of the entering member. When thus connected, the locking member or sector 19 is placed in the recess 18 therefor, when its recessed ends will engage the ends 31 of the flange 26 on the receiving member. When thus located, the parts may be securely held together by means of the retaining-screw 21, which engages a portion of the member 16 as well as a part of the locking member or sector.

Having thus fully described my invention, what I claim as new, and desire to secure by Letters Patent, is—

1. In a hose-coupling the members of which are connected and disconnected by a transverse movement thereof, the combination with the receiving member having a segmentally-recessed annular flange on its face, of the entering member having an annular flange on its face to engage the flange on the other member, a locking piece or sector located in said recess, and means to secure said piece to the receiving member, substantially as described.

2. In a hose-coupling the members of which are connected and disconnected by a transverse movement thereof, the combination with the receiving member having a segmentally-recessed annular flange on its face and provided with a depression at about the middle of said recess, said depression having in its bottom an outwardly-extending portion, of the entering member having an annular flange on its face to engage the flange on the other member, a locking-piece located in said recess and having at about its middle a depression provided at its bottom with an outwardly-extending portion, and a hollow screw located in said depressions, substantially as described.

ALFRED ANDERSON.

Witnesses:
 CHARLES C. TILLMAN,
 A. GUSTAFSON.